United States Patent
Proctor, Jr. et al.

(10) Patent No.: US 7,200,134 B2
(45) Date of Patent: Apr. 3, 2007

(54) WIRELESS AREA NETWORK USING FREQUENCY TRANSLATION AND RETRANSMISSION BASED ON MODIFIED PROTOCOL MESSAGES FOR ENHANCING NETWORK COVERAGE

(75) Inventors: James A. Proctor, Jr., Melbourne Beach, FL (US); Kenneth M. Gainey, Satellite Beach, FL (US)

(73) Assignee: WiDeFi, Inc., Melbourne, FL (US)

( * ) Notice: Subject to any disclaimer, the term of this patent is extended or adjusted under 35 U.S.C. 154(b) by 99 days.

(21) Appl. No.: 10/529,037

(22) PCT Filed: Oct. 1, 2003

(86) PCT No.: PCT/US03/28558

§ 371 (c)(1),
(2), (4) Date: Mar. 24, 2005

(87) PCT Pub. No.: WO2004/032362

PCT Pub. Date: Apr. 15, 2004

(65) Prior Publication Data

US 2005/0256963 A1    Nov. 17, 2005

Related U.S. Application Data

(60) Provisional application No. 60/414,888, filed on Oct. 1, 2002.

(51) Int. Cl.
*H04J 1/06*    (2006.01)
(52) U.S. Cl. .................. 370/343; 370/310; 370/315; 455/3.01; 455/151.2
(58) Field of Classification Search ................ 370/315, 370/310, 343, 447; 455/560, 16, 3.01, 151.2
See application file for complete search history.

(56) References Cited

U.S. PATENT DOCUMENTS

| | | | |
|---|---|---|---|
| 5,659,879 A | | 8/1997 | Dupuy et al. |
| 5,684,801 A | * | 11/1997 | Amitay et al. ............. 370/447 |
| 5,890,055 A | * | 3/1999 | Chu et al. ................... 455/16 |
| 2001/0031646 A1 | * | 10/2001 | Williams .................. 455/560 |
| 2003/0185163 A1 | * | 10/2003 | Bertonis et al. ........... 370/315 |

FOREIGN PATENT DOCUMENTS

| | | |
|---|---|---|
| EP | 0 523 687 A2 | 1/1993 |
| EP | 0 860 953 A1 | 8/1998 |
| GB | 2 272 599 A | 5/1994 |

OTHER PUBLICATIONS

Supplemental European Search Report dated Oct. 9, 2006 issued from Eurpoean Patent Office for counterpart application No. 03759235.9-2411.

* cited by examiner

*Primary Examiner*—Le Hien Luu
(74) *Attorney, Agent, or Firm*—Posz Law Group, PLC

(57) ABSTRACT

In a wireless communications network such as a WLAN, a frequency translating repeater (200, 204) facilitates and enhances wireless communication between a first communication device (100) and one or more second client unit (104, 105) using frequency translation and retransmission based on modified protocol messages (410). A DS parameter message (310) may include a frequency channel intended for use between one or more of repeaters (200, 204) and client units (104, 105) but does not include the frequency channel between one or more of repeaters (200, 204) and the first communication device (100).

29 Claims, 4 Drawing Sheets

WIRELESS AREA NETWORK USING FREQUENCY TRANSLATION AND RETRANSMISSION BASED ON MODIFIED PROTOCOL MESSAGES FOR ENHANCING NETWORK COVERAGE

CROSS-REFERENCE TO RELATED APPLICATIONS

This application is related to PCT Application PCT/US03/16208 entitled REPEATER FOR WLAN, and is further related to and claims priority from U.S. provisional Application Ser. No. 60/414,888, filed on Oct. 1, 2002 both of which are incorporated herein by reference.

FIELD OF THE INVENTION

The present invention relates generally to wireless local area networks and more specifically to increasing the range of a wireless local area network (WLAN).

BACKGROUND OF THE INVENTION

Several standard protocols for wireless local area networks, commonly referred to as WLANs, are becoming popular. These include protocols such as 802.11 (as set forth in the 802.11 wireless standards), home RF, and Bluetooth. The standard wireless protocol with the most commercial success to date is the 802.11b protocol.

While the specifications of products utilizing the above standard wireless protocols commonly indicate data rates on the order of, for example, 11 MBPS and ranges on the order of, for example, 100 meters, these performance levels are rarely, if ever, realized. Performance shortcomings between actual and specified performance levels have many causes including attenuation of the radiation paths of RF signals, which are typically in the range of 2.4 GHz in an operating environment such as an indoor environment. Base or AP to receiver or client ranges are generally less than the coverage range required in a typical home, and may be as little as 10 to 15 meters. Further, in structures having split floor plans, such as ranch style or two story homes, or those constructed of materials capable of attenuating RF signals, areas in which wireless coverage is needed may be physically separated by distances outside of the range of, for example, an 802.11 protocol based system. Attenuation problems may be exacerbated in the presence of interference in the operating band, such as interference from other 2.4 GHz devices or wideband interference with in-band energy. Still further, data rates of devices operating using the above standard wireless protocols are dependent on signal strength. As distances in the area of coverage increase, wireless system performance typically decreases. Lastly, the structure of the protocols themselves may affect the operational range.

One common practice in the mobile wireless industry to increase the range of wireless systems is through the use of repeaters. However, problems and complications arise in that system receivers and transmitters may operate at the same frequency in a WLAN utilizing, for example, 802.11 or 802.16 WLAN wireless protocol. In such systems, when multiple transmitters operate simultaneously, as would be the case in repeater operation, difficulties arise. Other problems arise in that, for example, the random packet nature of typical WLAN protocols provides no defined receive and transmit periods. Because packets from each wireless network node are spontaneously generated and transmitted and are not temporally predictable packet collisions may occur.

Some remedies exist to address such difficulties, such as, for example, collision avoidance and random back-off protocols, which are used to avoid two or more nodes transmitting packets at the same time. Under 802.11 standard protocol, for example, a distributed coordination function (DCF) may be used for collision avoidance.

Such operation is significantly different than the operation of many other cellular repeater systems, such as those systems based on IS-136, IS-95 or IS-2000 standards, where the receive and transmit bands are separated by a deplexing frequency offset. Frequency division duplexing or multiplexing, (FDD or FDM), operation simplifies repeater operation since conflicts associated with repeater operation, such as those arising in situations where the receiver and transmitter channels are on the same frequency, are not present.

Other cellular mobile systems separate receive and transmit channels by time rather than by frequency and further utilize scheduled times for specific uplink/downlink transmissions. Such operation is commonly referred to as time division duplexing or multiplexing, e.g. TDD or TDM. Repeaters for these systems are easily built, as the transmission and reception times are well known and are broadcast by a base station. Receivers and transmitters for these systems may be isolated by any number of means including physical separation, antenna patterns, or polarization isolation.

Thus, WLAN repeaters operating on the same frequencies with, for example, TDD but no scheduling are presented with unique constraints due to the spontaneous transmission capabilities of network nodes and therefore require a unique solution. Further, in cases where uplink and downlink times are known, repeaters configured to ignore schedule information may be less costly to build. Thus some form of isolation must exist between the receive and transmit channels of WLAN repeaters using the same frequency for both channels. While some related systems such as, for example, CDMA systems used in wireless telephony, achieve channel isolation using sophisticated techniques such as directional antennas, physical separation of the receive and transmit antennas, or the like, such techniques are not practical for WLAN repeaters in many operating environments such as in the home where complicated hardware or lengthy cabling is not desirable or may be too costly.

One system, described in International Application No. PCT/US03/16208 and commonly owned by the assignee of the present application, resolves many of the above identified problems by providing a repeater which isolates receive and transmit channels using a frequency detection and translation method. The WLAN repeater described therein allows two WLAN units to communicate by translating packets associated with one device at a first frequency channel to a second frequency channel used by a second device. The direction associated with the translation or conversion, e.g. from the frequency associated with the first channel to the frequency associated with the second channel, or from the second channel to the first channel, depends upon a real time configuration of the repeater and the WLAN environment. The WLAN repeater may be configured to monitor both channels for transmissions and, when a transmission is detected, translate the received signal at the first frequency to the other channel, where it is transmitted at the second frequency.

The above described approach solves both the isolation issue and the spontaneous transmission problems as described above by monitoring and translating in response to packet transmissions and may further be implemented in a small inexpensive unit. However, due to requirements associated with the WLAN protocols, the effectiveness of the previously mentioned solution may be limited. For example, the IEEE 802.11 standard requires that an access point transmit a channel identifier indicating the channel upon which the AP is communicating in a protocol message commonly referred to as a beacon. The frequency translating repeater in the above identified application retransmits the beacon on a different channel from the original AP channel. In addition, packets from the AP are transmitted on the same channel as the translated beacon, e.g. the translated frequency. Problems arise in that the beacon identifies that associated packets are being transmitted on the original AP transmission frequency and not the translated frequency. A client unit receiving the beacon may switch to the original AP transmission frequency contained in the beacon and miss packets sent by the repeater on the translated frequency or may discard the beacon preventing a client from connecting.

SUMMARY OF THE INVENTION

Thus a method and apparatus for extending the range of a wireless local area network (WLAN), are described, wherein in accordance with one exemplary embodiment, the WLAN includes a base unit connected to a wide area network. The base unit communicates with at least one client unit using a protocol requiring the base unit and the at least one client unit to receive and transmit information on a same frequency channel, e.g. an 802.11, or the like protocol, the frequency channel chosen from at least two available frequencies. The base unit preferably identifies which of frequencies is chosen in a control parameter transmitted in a protocol message associated with the protocol.

In accordance with various exemplary embodiments, the present invention includes a technique for performing range extension utilizing repeaters for wireless local area networks including attendant advantages if specific protocols are used, such as the 802.11 protocol. In accordance with the present invention, MAC protocol messages, such as, for example, DS parameter messages, may be modified and used in a non-standard way. Combined with the use of frequency translating repeaters, the present invention allows for greater isolation and increased gain and hence range in a wireless local area network.

As previously described, some revisions of 802.11 include a message referred to as the DS parameters set message. It should be noted that in accordance with the present invention, the beacon is only transmitted by the AP, not by client units or stations. The DS parameter specifies which channel the direct sequence spread spectrum wave form (802.11b) is transmitted on. Using a frequency translating repeater will cause the channel number to be incorrect relative to the DS parameter causing erroneous behavior for the client units or station devices (STA). In the present invention, the transmitted DS parameters set message is preferably modified with the channel number intended for the STA, rather than the channel that is transmitted on from the access point (AP). The translating repeater will then "correct" the message by performing the frequency translation, which will result in the message being retransmitted on the frequency identified in the beacon transmitted from the AP.

Interestingly, the above technique provides for beneficial system arrangements. Specifically, the channel from the AP to the repeater can be preserved for use by the AP, while the channel from the repeaters to client devices are separately allocated. For this application, the channel from the AP to the repeater, with the incorrect DS Parameter set message, is referred to as the back haul channel. The translating repeater to client station channel is referred to as the off-ramp repeater. Further, highway repeaters may be utilized between the AP and the client stations to extend the wireless local area network even further.

DETAILED DESCRIPTION OF THE INVENTION

Figure 1:
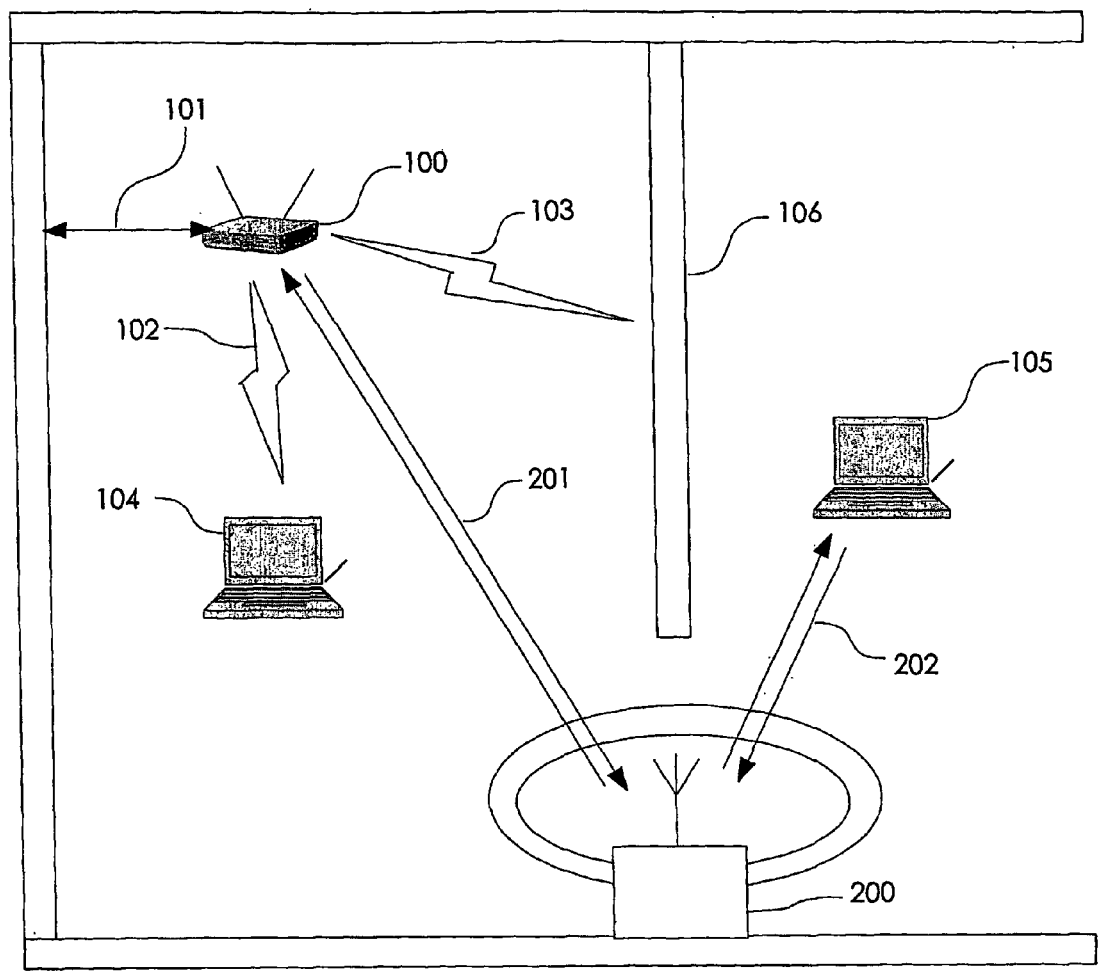
FIG. 1 is a block diagram illustrating a wireless network environment including an exemplary repeater.

Referring now to FIG. 1, a wide area connection 101, which could be an Ethernet connection, a T1 line, a wideband wireless connection or any other electrical connection providing data communications, may be connected to a wireless gateway, or access point 100. The wireless gateway 100 sends RF signals, such as IEEE 802.11 packets or signals based upon Bluetooth, Hyperlan, or other wireless communication protocols, to client units 104, 105, which may be personal computers, personal digital assistants, or any other device capable of communicating with other like devices through one of the above mentioned wireless protocols. Respective propagation, or RF, paths to each of the client units are shown as 102, 103.

While the signal carried over RF path 102 is of sufficient strength to maintain high-speed data packet communications between the client unit 104 and the wireless gateway 100, the signals carried over the RF path 103 and intended for the client unit 105 would be attenuated when passing through a structural barrier such as a wall 106 to a point where few, if any, data packets are received in either direction if not for a wireless repeater 200, the structure and operation of which will now be described.

To enhance the coverage of the wireless gateway 100, and therefore the overall wireless network, and/or communication data rate to the client unit 105, the wireless repeater 200 receives packets transmitted on a first frequency channel 201 from the wireless gateway 100. The wireless repeater 200, which may have dimensions of, for example, 2.5"×3.5"× 0.5", and which preferably is capable of being plugged into a standard electrical outlet and operating on 110 V AC power, detects the presence of a packet on the first frequency channel 201, receives the packet and re-transmits the packet with more power on a second frequency channel 202. Unlike conventional WLAN operating protocols, the client unit 105 operates on the second frequency channel, even though the wireless gateway 100 operates on the first frequency channel. To perform the return packet operation, the wireless repeater 200 detects the presence of a transmitted packet on the second frequency channel 202 from the client unit 105, receives the packet on the second frequency channel 202, and re-transmits the packet on the first frequency channel 201. The wireless gateway 100 then receives the packet on the first frequency channel 201. In this way, the wireless repeater 200 is capable of simultaneously receiving and transmitting signals as well as extending the coverage and performance of the wireless gateway 100 to the client unit 105.

It should also be appreciated that wireless repeater 200 may be used to enhance communications in a peer-to-peer network from one client unit to another client unit. In a scenario where many units are isolated form one another, wireless repeater 200 preferably acts as a wireless hub allowing two different groups of units to communicate in such an isolated environment where communication in accordance with standard RF propagation and coverage rules would otherwise be inhibited.

However, as described herein above, repeater systems using frequency translation may encounter problems, for example, when beacon signals are used. In accordance therefore with the present invention, range extension may be realized in such systems using repeaters for wireless local area networks and may be particularly advantageous when specific protocols are used, such as, for example, the 802.11 series of protocols by modifying the beacon signal to reflect the frequency translation. In accordance with various exemplary embodiments thereof, the present invention further includes the use of medium-access control (MAC) protocol messages modified in a novel manner. Thus, frequency translating repeaters may be used to allow for greater isolation and increased gain and resulting in greater range in a wireless local area network.

In some versions of the 802.11 standard, a message referred to as the DS parameters set may be associated with the transmission of a beacon signal as described herein above. It is important to note that a beacon signal is generally transmitted by an access point (AP), and not by individual nodes or stations. The DS parameter specifies which channel the direct sequence spread spectrum waveform, for example, as specified in 802.11b, is transmitted on. The use of a frequency translating repeater will cause a discrepancy between the actual transmit channel number, e.g. the "translated to" channel number, and the channel specified in the DS parameter, e.g. the "translated from" channel number, causing traffic loss and other erroneous behavior for client station devices (STA).

In contrast, an exemplary frequency translating repeater in accordance with various exemplary embodiments of the present invention, modifies the DS parameters to update the channel number, e.g. frequency, with the new channel number based on frequency translation that will be performed with subsequent data packets transmitted on that channel number from a source or AP. The translating repeater then "corrects" the message by performing the frequency translation resulting in the message being retransmitted on the frequency identified in the beacon transmitted from the AP at the destination.

Interestingly, the present invention provides for beneficial system arrangements wherein, for example, the channel number from the AP to the repeater may be preserved for use by the AP to repeater link, while the channel number from the repeater or repeaters to client units are separately allocated. Further in accordance with the present invention, the channel number from the AP to the repeater, e.g. the one having the incorrect DS Parameter set message, may be referred to as the back haul channel. The translating repeater, e.g. the repeater communicating with the client station or stations may be referred to as the off-ramp repeater. Still further, one or more highway repeaters may be used between the AP and the stations to extend the wireless local area network even further.

Referring again to FIG. 1, as described herein above, wide area connection 101 is preferably connected to a wireless gateway or access point (AP) 100. AP 100 communicates by transmitting and receiving, for example, data packets to wide area connection 101 on one side and sends RF signals 102 and 103, to client units 104 and 105. In accordance with a preferred embodiment, RF signals 102 and 103 preferably carry, for example, IEEE 802.11 packets. In accordance with alternative exemplary embodiments, RF signals 102 and 103 could also be associated with Bluetooth, Hyperlan, or the like wireless communication protocols. Two propagation paths to each of the client units are further shown associated with RF signals 102 and 103. It should be noted that while the signal strength resulting from the path associated with RF signal 102 is sufficient to maintain high speed data packet communications with client unit 104, the signal strength resulting from the path associated with RF signal 103 however is attenuated, e.g. from obstacle 106 which may be a wall or other obstruction, to a level where few or no data packets are able to be received in either direction between, for example, AP 100 and client unit 105.

To address the difficulties posed by obstructions as described above and attendant attenuation of the signal strength along obstructed paths and thus to enhance the coverage and/or communication data rate to client unit 105, exemplary wireless repeater 200, as shown in FIG. 1, may be used to retransmit packets beyond a range limited by propagation path constraints through, for example, frequency translation. Packets transmitted on a first frequency channel 201 from AP 100 are received at repeater 200 and re-transmitted, preferably with a greater power level, on a second frequency channel 202. Client unit 105 preferably operates on second frequency channel 202 as if AP 100 were also operating on it, e.g. with no knowledge that AP 100 is really operating on first frequency channel 201 such that the frequency translation is transparent. To perform return packet operations, repeater unit 200 detects the presence of a transmitted return packet on second frequency channel 202 from client unit 105, and is preferably configured to receive the packet on second frequency channel 202, retransmitting them, for example to AP 100, on first frequency channel 201. Repeater 200 may thus receive and transmit packets at the same time on different frequency channels extending the coverage and performance of the connection between AP 100 and client unit 105, peer-to-peer connections, e.g. from one client unit to another client unit. When many units are isolated from one another in the communication environment, repeater unit 200 further acts as a wireless bridge allowing two different groups of units to communicate, where optimum RF propagation and coverage or in many cases any RF propagation and coverage was not previously possible.

Thus in accordance with various exemplary embodiments, wireless repeater 200 is preferably capable of receiving two different frequencies simultaneously, e.g. first frequency channel 201 and second frequency channel 202 determining which channel is carrying a signal associated with, for example, the transmission of a packet, translating from the original frequency channel to an alternative frequency channel and retransmitting the frequency translated version of the received signal on the alternative channel. Details of internal repeater operation may be found in co-pending PCT Application No. PCT/US03/16208.

Referring still to FIG. 1, and in accordance with one preferred exemplary embodiment of an 802.11 system, a beacon message transmitted from AP 100 to another device has a specific field, e.g. the channel number field of a DS parameter set. However the channel number identified in the beacon transmitted from AP 100, for example, to repeater 200, does not correspond to the actual channel number used between AP 100 and repeater 200, e.g. channel 201. Rather, in accordance with the present invention, the channel of operation identified in the beacon from AP 100 is the channel to be used after frequency translation occurs in repeater 200, which will be referred to hereinafter as frequency translating repeater 200. More specifically, a signal could be modulated as a IEEE 802.11b waveform within AP 100, but transmitted on the incorrect band as defined by the IEEE 802.11a standard at a frequency of 5 GHz. It should be apparent to one of ordinary skill in the art how to transmit the signals on the frequencies described herein according to the protocols set forth, and, further, the DS parameter may be reset easily by modifying its channel set value, in accordance with for example, IEEE 802.11, Paragraph 7.3.2.4 "DSS Parameter Set Element" as described in greater detail herein below.

Thus frequency translating repeater 200 in accordance with one of various alternative exemplary embodiments, may convert the 802.11b modulated packet from a first frequency channel to a second frequency channel, where it may be received by one or more clients, such as station devices (STA) or client units 104 or 105. Client units 104 or 105 preferably receive a beacon identifying an 802.11b channel as being the appropriate channel for communication, and would receive information packets translated by the repeater 200 from the "a" band used by AP 100 to the "b" band. It will be appreciated by one of ordinary skill in the art that an exemplary frequency translating repeater in accordance with various exemplary and alternative exemplary embodiments may translate between any 2 channels, such as from an 802.11a channel to another 802.11a channel, 802.11a channel to an 802.11b channel, 802.11b channel to an 802.11a channel, 802.11b channel to another 802.11b channel, and so on. It is further contemplated that an 802.11g channel or a channel associated with any suitable wireless protocol may also be used in accordance with frequency translation, without departing from the invention.

On the return signal path, station client unit 105 may transmit the standard compliant 802.11b signal in the appropriate frequency band, e.g. as defined in the standard, and repeater 200 detects the 802.11b signal and translates packets carried thereon to frequency channels defined in the 802.11a standard, but not conforming to the 802.11a OFDM modulation. AP 100 may receive the 802.11b modulated waveform in the frequency channels defined for 802.11a signals, and will process the waveform it as if it were in a 802.11b frequency channel.

Thus as can be seen from the above, AP 100 uses an IEEE 802.11b modulation compliant waveform, but transmits signals on a non standard-conforming band, e.g. on a different band from one defined as appropriate by the IEEE 802.11b standard. A frequency translating repeater 200 in accordance with various exemplary embodiments of the present invention, converts the 802.11b modulated packet from the "a" band on one channel to the "b" band on another channel where it is used by a station device such as client unit 105. When signals return from a station, e.g. client unit 104 or 105 to AP 100, client units 104 or 105 may preferably transmit the standard 802.11b compliant signal in the appropriate band, e.g. as defined in the standard, repeater 200 detects the 802.11b signal and translates it in accordance with frequency channels defined in the 802.11a standard, but in conflict with, for example, the channel of operation, if present, in the DS parameter set message.

It will be appreciated that in order to perform frequency translation to channels in different bands, a multi-band capability is preferably present in one or more of an exemplary AP, frequency translating repeater, client station or the like node of an exemplary WLAN. Such a multi-band capability preferably allows, for example, both 2.4 GHz and 5 GHz waveforms to be generated and transmitted and detected and received through the use of appropriate hardware such as antennae, power control circuits, transceivers, and control software within the same device or node.

In accordance with various exemplary embodiments of the present invention, AP 100 preferably deliberately transmits signals on a frequency different from the frequency identified for transmission in the beacon signal (channel identifier). Two significant benefits result from deliberate "spoofing" within the beacon message in one band, then translating to the specific band in the message. First, as described in greater detail below, translating can keep back haul channels to/from a repeater open and free from client traffic, allowing capacity to be distributed among repeaters where needed. Second, translating can allow the DS parameter message to be correct once it is translated to the intended channel via the repeater 200, allowing correct and standard compliant operation with client units 104 and 105 from any manufacturer.

Figure 2:
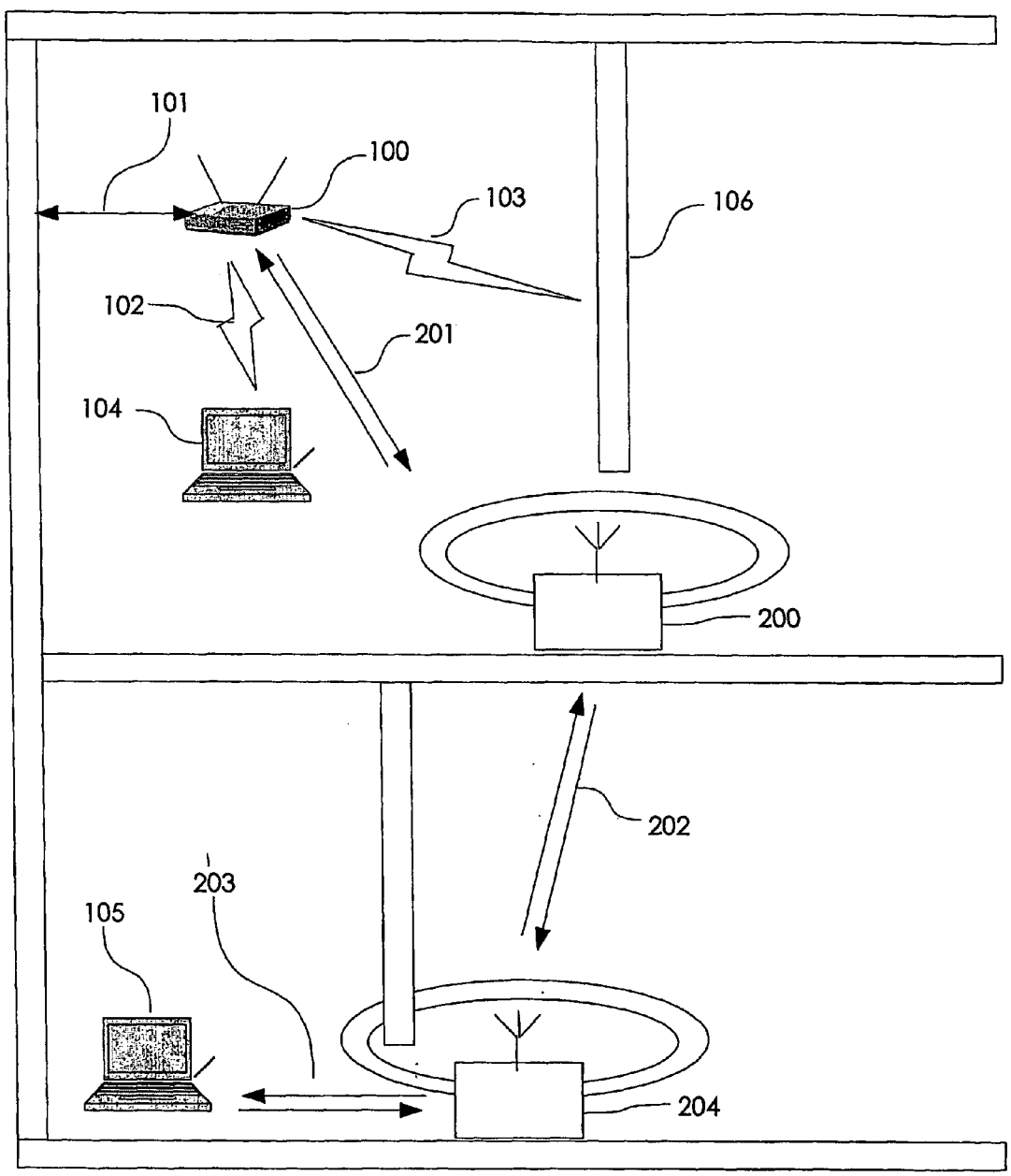
FIG. 2 is a block diagram illustrating an alternative wireless network environment including two exemplary repeaters.

It should be noted that in accordance with various exemplary and alternative exemplary embodiments, for example as illustrated in FIG. 2, a back haul channel may refer to the channel with the incorrect DS Parameter set message and a translating repeater may be referred to as off-ramp repeater 204. FIG. 2 further shows hi-way repeater 200 and off-ramp repeater 204 with three distinct channels of operation: channel 201 between AP 100 and hi-way repeater 200, interim channel or off-ramp channel 202 between hi-way repeater 200 and off-ramp repeater 204, and local channel 203 between off-ramp repeater 204 and client unit 105.

It should be noted that one or more repeaters such as hi-way repeater 200 and off-ramp repeater 204 may connect to any specific backhaul or off-ramp channel allowing an increase in coverage for any given AP 100, as communication with stations (STA), client units, or the like could be extended to the radiated foot print potentially including a plurality of repeaters rather than just a single repeater. It is further important to note that hi-way repeater 200 and off-ramp repeater 204 simply translate and rebroadcast information packets as well as beacon information thereby making them similar to repeaters described in co-pending PCT Application No. PCT/US03/16208.

Before describing the operation of an exemplary embodiment in accordance with FIG. 2, it must be understood that the present invention may be used in an environment where present wireless local area standards are used. As defined, for example, in the 1999 IEEE 802.11 wireless standards and as further shown in Table 1 herein below, paragraphs 15.4.6.2 and 18.4.6.2, all the channels defined for transmission with the DS parameter are in the 2.4 GHz band.

TABLE 1

| CHNL-ID | Freq | X'10' FCC | X'20' IC | X'30' ETSI | X'31' Spain | X'32' France | X'40' MKK |
|---------|------|-----------|----------|------------|-------------|--------------|-----------|
| 1 | 2412 MHz | X | X | X | | | |
| 2 | 2417 MHz | X | X | X | | | |
| 3 | 2422 MHz | X | X | X | | | |

TABLE 1-continued

| CHNL-ID | Freq | X'10' FCC | X'20' IC | X'30' ETSI | X'31' Spain | X'32' France | X'40' MKK |
|---|---|---|---|---|---|---|---|
| 4 | 2427 MHz | X | X | X | | | |
| 5 | 2432 MHz | X | X | X | | | |
| 6 | 2437 MHz | X | X | X | | | |
| 7 | 2442 MHz | X | X | X | | | |
| 8 | 2447 MHz | X | X | X | | | |
| 9 | 2452 MHz | X | X | X | | | |
| 10 | 2457 MHz | X | X | X | X | X | |
| 11 | 2462 MHz | X | X | X | X | X | |
| 12 | 2467 MHz | | | X | | X | |
| 13 | 2472 MHz | | | X | | X | |
| 14 | 2477 MHz | | | | | | X |

In contrast, more recently allowed bands under, for example, Federal Communications Commission code part 15.407, signals are transmitted in the 5 GHz band. Thus in accordance with various exemplary embodiments of the present invention, signals on the backhaul channel, for example, between AP 100 and repeater 200 are preferably at 5 GHz, and may be frequency translated from the 5 GHz band to a channel in the 2.4 GHz band, for example, as specified in the DS parameter set message in repeater 204. Note that stations receiving a message with an incorrect channel number, will generally reject the messages on that channel.

In accordance with various exemplary embodiments, AP 100, hi-way repeater 200 and off-ramp repeater 204 will all preferably be pre-programmed to communicate with each other on identified channels. Considering, by way of illustration, an exemplary embodiment where, in accordance with the IEEE 802.11a standard, twelve channels at 5 GHz are used and, in accordance with the IEEE 802.11b standard, six channels at 2.4 GHz are used, a system, for example, as shown in FIG. 2, can operate as follows. AP 100 is preferably programmed to transmit and receive information signals on channel 6 in the 5 GHz band. Beacon signals would also be transmitted on channel 6 of the 5 GHz band, but the channel identifier would be channel 1 of the 2.4 GHz band.

Hi-way repeater 200 is preferably able to receive information packets and beacon signals on channel 6 and retransmit those signals on channel 8 of the 5 GHz band. Off-ramp repeater 204 is preferably set up to receive on channel 8 of the 5 GHz band and retransmit on, for example, channel 1 in the 2.4 GHz band. It should be noted that accordingly, beacon signals from AP 100, translated from channel 6 in the 5 GHz band to channel 1 in the 2.4 GHz band by repeater 204, would correctly identify channel 1 in the 2.4 GHz band as the correct channel for communication.

Further, for signals transmitted from client unit 105 destined for AP 100, repeater 204 preferably receives on channel 1 in the 2.4 GHz band and transmits on channel 8 of the 5 GHz band. Signals from off-ramp repeater 204 transmitted on channel 8 of the 5 GHz band are received by hi-way repeater 200 and retransmitted on channel 6 of the 5 GHz band where AP 100 receives signals on channel 6 of the 5 GHz band.

As will be appreciated from the above description, repeaters operate to detect signals on one of two channels and retransmit the signals on the other channel as described in detail in co-pending PCT Application No. PCT/US03/16208. Thus off-ramp repeater 204 and hi-way repeater 200, for example, must be pre-programmed, whether in the field (preferable), during manufacture, or the like, for appropriate channels of operation. One of ordinary skill in the art will recognize that repeaters 200 and 204 and AP 100 could be programmed to communicate on boot-up or re-boot with each other and establish channels of operation. Specifically, the AP 100 could transmit control signals to repeaters 200, 204 to establish channels of operation.

Several additional advantages become apparent using the above system structure. For example, many back haul channels such as back haul channel 201 may be established between different APs or an AP with multi-channel capability opening significantly expanded capability for one or more off-ramp repeaters such as off-ramp repeater 204. Specifically, by monitoring activity on various channels of operation, an assessment of the traffic load may be made, both in the local station, e.g. the area in which client unit 105 is located, as well as on any back haul channel. Off-ramp repeater 204 can choose the best back haul channel for the local load allowing, for example, two heavily utilized repeaters to "choose" different back haul channels and thus provide a load leveling feature. It will be appreciated that in order to balance loads in such a manner, information associated with which backhaul channels are intended for which local station channels, e.g. which channels to client unit 105, must be stored in one or more of hi-way repeater 200, off-ramp repeater 204, and AP 100 using, for example, a table matching stations or client units to various repeaters, a constant translation distance, or some other mathematical rule for mapping.

Figure 3A:
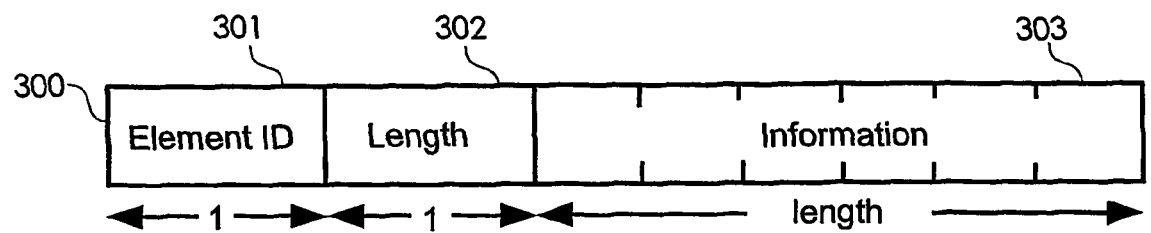
FIG. 3A a diagram illustrating packet configurations for various exemplary protocol units in a wireless local area network (WLAN).
Figure 3B:
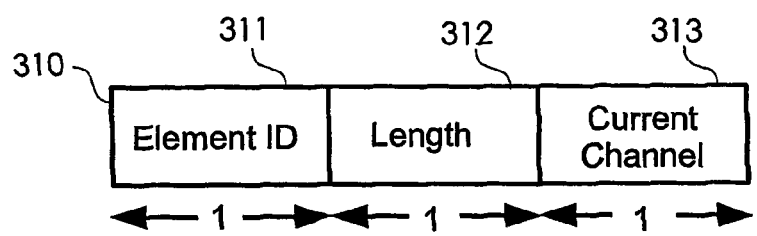
FIG. 3B a diagram illustrating additional packet configurations for various exemplary protocol units in a wireless local area network (WLAN).

Exemplary protocol units for sending the beacon, DS, and probe messages are shown in FIG. 3A and FIG. 3B. Protocol unit 300 may include an element ID 301 to identify the element being specified by the message, length 302 indicates the length of the variable length information contained in information 303. Such a format may be used, for example, for beacon and probe messages which are further governed by the IEEE 802.11 standard, e.g. section 7.2.3.1 and 7.2.3.9 respectively of the 1999 Edition as will be appreciated by those of ordinary skill. As further illustrated in FIG. 3B, protocol unit 310, which is preferably a DS parameter set element, may include element ID 311, which is specified as a value of 3 for DS parameter set purposes, length 312, and current channel 313, which channel may be selected according to, for example, values in Table 1, or other values as would be appreciated by those of ordinary skill in the art.

Figure 4:
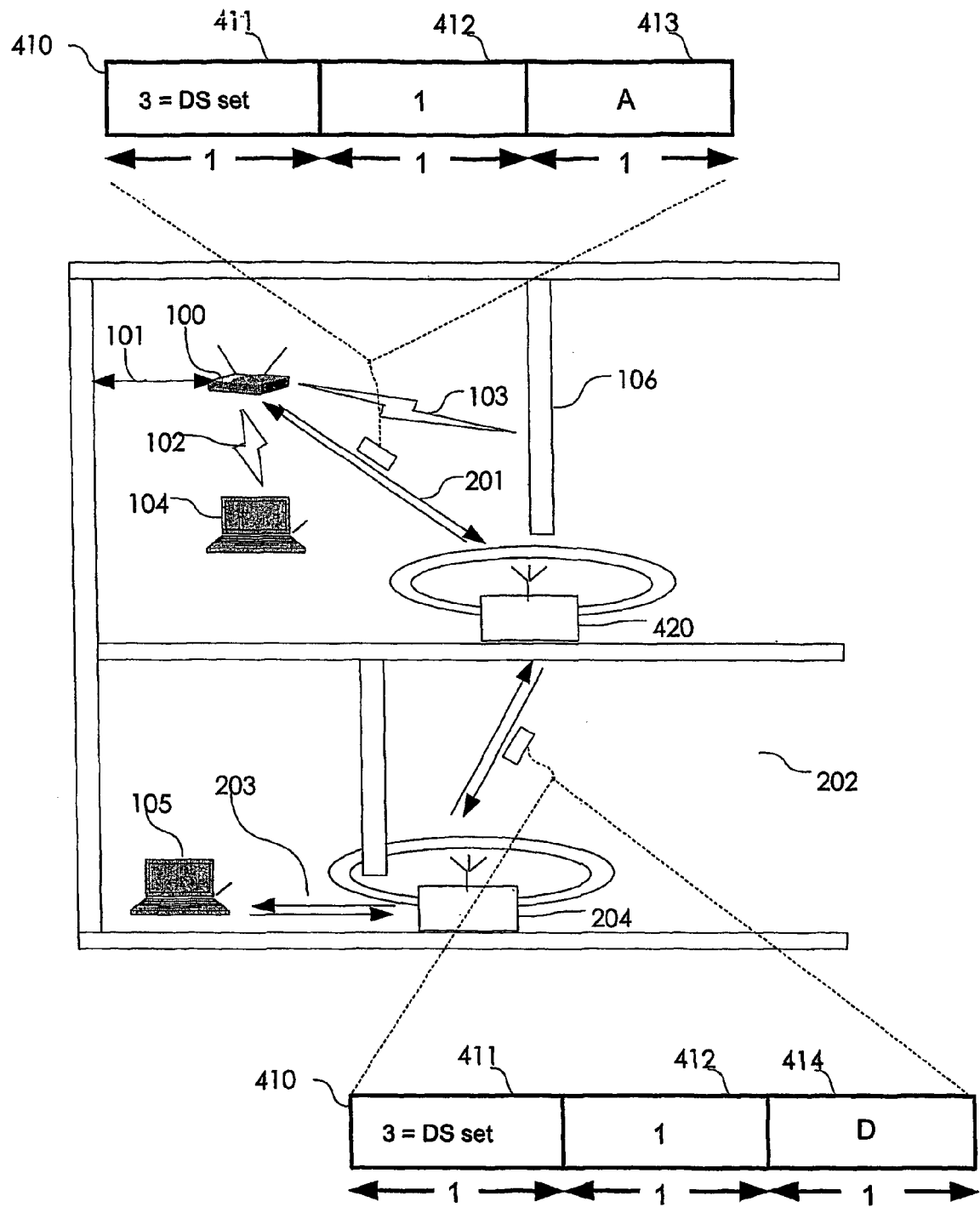
FIG. 4 is a diagram illustrating channel identifier packet transmission between units in accordance with various exemplary embodiments of a wireless local area network (WLAN) in accordance with the present invention.

It should be noted that variations and alternative exemplary embodiments in accordance with the present invention, for example, as illustrated in FIG. 4, may include translating from one channel in the 5 GHz to another channel in the 5 GHz band using an 802.11a modulation wave form. DS parameter message 410 may be optionally used in such a case where the channel specification must be "spoofed" by AP 100 as described above. Accordingly, channel number 413 specified in DS parameter message 410 reflects the correct channel number after translation to the final frequency intended as the receiving channel for the client unit 105. In accordance with another alternative exemplary embodiment, signals are preferably transmitted from one 802.11b channel to another 802.11b channel. The DS parameters message in such an instance will be spoofed to allow for proper operation of client unit 105 and 802.11b modulation would be used throughout the system.

Still other techniques in accordance with alternative exemplary embodiments, allow operation on back haul channel 201, off-ramp channel 202, and local channel 203. Accordingly, AP 100 may preferably send more than one probe response or more than one beacon, with a DS Parameter message defined for each of the channels of operation. In this way, client unit 105 may operate on any of the channels where signal is present. Further, while various exemplary embodiments of the present invention are described herein in the context of existing standards, such as 802.11a and 802.11b, techniques maybe practiced in an environment with different standards without departing from the present invention. Thus the invention is described herein in detail with particular reference to presently preferred embodiments. However, it will be understood that variations and modifications can be effected within the scope and spirit of the invention.

What is claimed is:

1. A method for extending the range of a wireless local area network (WLAN), the WLAN including a base unit connected to a wide area network, the base unit communicating with at least one client unit using a protocol requiring the base unit and the at least one client unit to receive and transmit information on a same frequency chosen from at least two available frequencies, the base unit identifying which of the at least two available frequencies is chosen in a control parameter transmitted in a protocol message associated with the protocol, the method comprising:

transmitting a modified control parameter so that the chosen one of the at least two available frequencies does not correspond to a channel upon which the base unit is operating, setting a receive channel associated with the client unit to match the chosen one of the at least two available frequencies in the control parameter transmitted by the base unit, and translating a first information signal transmitted from a first operating channel associated with the base unit and retransmitting the information signal on a second operating channel to the client unit, and translating a second information signal transmitted from the second operating channel associated with the client unit and retransmitting the second information signal on the first operating channel associated with the base unit.

2. The method according to claim 1, further comprising modifying the control parameter such that a different one of the at least two available frequencies is identified as chosen.

3. The method according to claim 1, wherein the base unit is connected to a wired wide area network.

4. The method according to claim 1, wherein the base unit is connected to a wireless wide area network.

5. The method according to claim 1, wherein the protocol includes one of:
802.11a, 802.11b, 802.11a, 802.11g, Bluetooth, TDS-CDMA, TDD-W-CDMA, 802.16, and 802.20.

6. The method according to claim 1, wherein the translation is performed on an unscheduled basis.

7. In a wireless network including one or more base units and one or more client units, the one or more base units capable of transmitting on a first one of the at least two frequency channels and the one or more client units capable of transmitting on a second one of the at least two frequency channels, each of the one or more base units capable of transmitting a channel identifier, an apparatus for enhancing coverage of the wireless network, comprising:

a frequency translating repeater configured to:

receive the channel identifier identifying the second one of the at least two frequency channels as a designated channel for communicating with the one or more base units;

detect a first information signal from the one or more base units on the first one of the at least two frequency channels and retransmit the first information signal on the second one of the at least two frequency channels in accordance with the channel identifier; and detect a second information signal from the one or more client units on the second one of the at least two frequency channels in accordance with the channel identifier and retransmit the second information signal on the first one of the at least two frequency channels.

8. The apparatus according to claim 7, wherein the first one of the at least two frequency channels includes a 5 GHz band frequency channel in accordance with the IEEE 802.11a standard.

9. The apparatus according to claim 8, wherein the second one of the at least two frequency channels includes a 2.4 GHz band frequency channel in accordance with the IEEE 802.11b standard.

10. The apparatus according to claim 7, wherein the channel identifier includes a direct sequence (DS) parameter signal in accordance with the IEEE 802.11 standard.

11. The apparatus according to claim 7, wherein each of the one or more base units is configured to transmit the channel identifier identifying the base unit as transmitting a IEEE 802.11b modulation waveform, and wherein the first one of the at least two frequency channels includes a 5 GHz band in accordance with the IEEE 802.11a standard.

12. The apparatus according to claim 11, wherein the frequency translating repeater is configured to translate the 802.11b modulated waveform from the 5 GHz band to the second one of the at least two frequency channels and wherein the second one of the at least two frequency channels includes a 2.4 GHz band in accordance with the IEEE 802.11b for retransmission to the one or more client units.

13. The apparatus according to claim 12, wherein the frequency translating repeater is configured to detect the second information signal on the second one of the at least two frequency channels at the 2.4 GHZ band from the client unit, and to retransmit the second information signal at the first one of the at least two frequency channels, the frequency translating repeater configured to retransmit the second information signal in a modulation format which modulation format does not conform to the 802.11a orthogonal frequency division modulation (OFDM) standard.

14. In a wireless network including at least two frequency channels, one or more base units and one or more client units, the one or more base units capable of transmitting on the first one of the at least two frequency channels and the one or more client units capable of transmitting on the second one of the at least two frequency channels, the one or more base units transmitting a channel identifier identifying the second one of the at least two frequency channels as a designated channel for communicating with the one or more base units, an apparatus for enhancing coverage of the wireless network, comprising:

a first wireless repeater unit and a second wireless repeater unit for monitoring the at least two frequency channels and retransmitting a first information signal received on a first one of the at least two frequency channels on a second one of the at least two frequency channels, wherein the first wireless repeater unit is configured to:

receive the first information signal from the one or more base units on the first one of the at least two frequency channels;

retransmit the first information signal on a third frequency channel; and detect and receive the first information signal from the second wireless repeater unit on the third frequency channel, and retransmit the first information signal on the first one of the at least two frequency channels, and wherein the second wireless repeater unit is configured to:

detect and receive the first information signal from the first wireless repeater unit on the third frequency channel; and retransmit the first information signal on the second one of the at least two frequency channels, and detect and receive the first information signal from the one or more client units on the second one of the at least two frequency channels and retransmit the first information signal on the third frequency channel.

15. The apparatus according to claim 14, wherein the channel identifier includes a DS parameter signal in accordance with the IEEE 802.11 standard.

16. The apparatus according to claim 14, wherein the first wireless repeater unit is configured to monitor a traffic load associated with the first of the at least two frequency channels to establish a load level measurement, and choose one of the second and the third frequency channels for communicating with the one or more base units to equalize the traffic load based on the load level measurement.

17. The apparatus according to claim 16, wherein the load level measurement includes a determination of which of one or more of the first, second and additional frequency channels has a lowest detected value associated with the traffic load.

18. The apparatus according to claim 16, wherein the load level measurement is determined by the traffic load associated with the one or more client units relative to the second wireless repeater unit.

19. The apparatus according to claim 16, wherein the first wireless repeater unit is configured to determine which of the first, the second, and the third frequency channels intended for specific ones of the one or more client units based on a contents of one or more DS parameter messages.

20. The apparatus according to claim 19, wherein the first wireless repeater unit further includes a memory and is configured to determine using information stored as a table in the memory.

21. The apparatus according to claim 19, wherein the first wireless repeater unit further includes a memory and is configured to determine using a rule stored in the memory.

22. The apparatus according to claim 19, wherein the first wireless repeater unit further includes a memory and is configured to determine using a stored constant offset stored in the memory.

23. The apparatus according to claim 14, wherein the second wireless repeater unit is configured to monitor a traffic load associated with the second of the at least two frequency channels to establish a load level measurement, and choose one of the second and the third frequency channels for communicating with the one or more base units to equalize the traffic load based on the load level measurement.

24. The apparatus according to claim 23, wherein the load level measurement includes a determination of which of one or more of the first, second and third frequency channels has a lowest detected value associated with the traffic load.

25. The apparatus according to claim 23, wherein the load level measurement is determined by the traffic load associated with the one or more client units relative to the first wireless repeater unit.

26. The apparatus according to claim 23, wherein the second wireless repeater unit is configured to determine which of the first, the second, and the third frequency channels intended for specific ones of the one or more client units based on a contents of one or more DS parameter messages.

27. The apparatus according to claim 26, wherein the second wireless repeater unit further includes a memory and is configured to determine using information stored as a table in the memory.

28. The apparatus according to claim 26, wherein the second wireless repeater unit further includes a memory and is configured to determine using a rule stored in the memory.

29. The apparatus according to claim 26, wherein the second wireless repeater unit further includes a memory and is configured to determine using a stored constant offset stored in the memory.

* * * * *